(12) United States Patent
VanSlembrouck et al.

(10) Patent No.: US 8,282,432 B2
(45) Date of Patent: Oct. 9, 2012

(54) WELD TERMINAL, SWITCH ASSEMBLY AND METHODS OF ATTACHMENT

(75) Inventors: Mark L. VanSlembrouck, Ray Township, MI (US); Donald M. Perkins, Sterling Heights, MI (US); David A. Vandeberghe, Clarkston, MI (US)

(73) Assignee: Inteva Products LLC, Troy, MI (US)

( * ) Notice: Subject to any disclaimer, the term of this patent is extended or adjusted under 35 U.S.C. 154(b) by 0 days.

(21) Appl. No.: 13/018,594

(22) Filed: Feb. 1, 2011

(65) Prior Publication Data

US 2011/0189904 A1 Aug. 4, 2011

Related U.S. Application Data

(63) Continuation of application No. 12/400,088, filed on Mar. 9, 2009, now Pat. No. 7,878,871.

(51) Int. Cl.
*H01R 4/02* (2006.01)

(52) U.S. Cl. .......................................... 439/874; 439/875

(58) Field of Classification Search .................. 439/874, 439/875
See application file for complete search history.

(56) References Cited

U.S. PATENT DOCUMENTS

| | | | |
|---|---|---|---|
| 4,551,786 A * | 11/1985 | Oka | ............................... 361/540 |
| 6,402,530 B1 | 6/2002 | Saito et al. | |
| 2002/0028590 A1 | 3/2002 | Saito et al. | |
| 2002/0117327 A1 | 8/2002 | Ono | |
| 2008/0032569 A1 | 2/2008 | Steiner et al. | |
| 2008/0102716 A1 | 5/2008 | Nishioka et al. | |

FOREIGN PATENT DOCUMENTS

EP 1 179 453 A2 2/2002

OTHER PUBLICATIONS

PCT International Search Report; International Application No. PCT/US2010/025830; Date of Mailing: Sep. 28, 2010 (Received Oct. 4, 2010).
PCT Written Opinion of the International Searching Authority; International Application No. PCT/US2010/025830; Date of Mailing: Sep. 28, 2010 (Received Oct. 4, 2010).

* cited by examiner

*Primary Examiner* — Thod D Ta
(74) *Attorney, Agent, or Firm* — Cantor Colburn LLP

(57) ABSTRACT

A terminal and electrical contact for a pair of leads of an electrical component is provided, the terminal having a pair of terminals each comprising a planar member comprising a conductive material that surrounds an opening in the planar member; and wherein one of the pair of leads is welded to one of the pair of terminals such that the lead traverses the opening and is welded to the terminal at a portion of the terminal adjacent to the opening and the other one of the pair of leads is welded to the other one of the pair of terminals such that the lead traverses the opening and is welded to the terminal at a portion of the other one of the pair of terminals adjacent to the opening, wherein the opening and the planar member are configured such that a high resistance zone is created at the portion of the terminal adjacent to the opening.

18 Claims, 2 Drawing Sheets

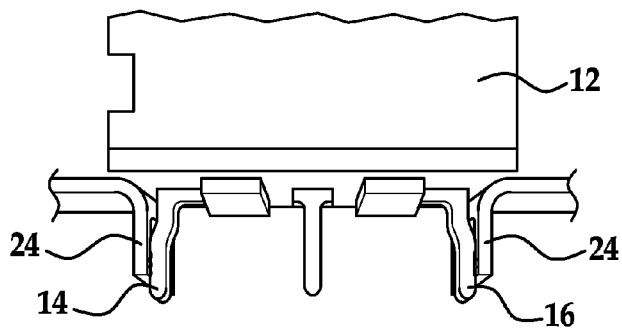
FIG. 4
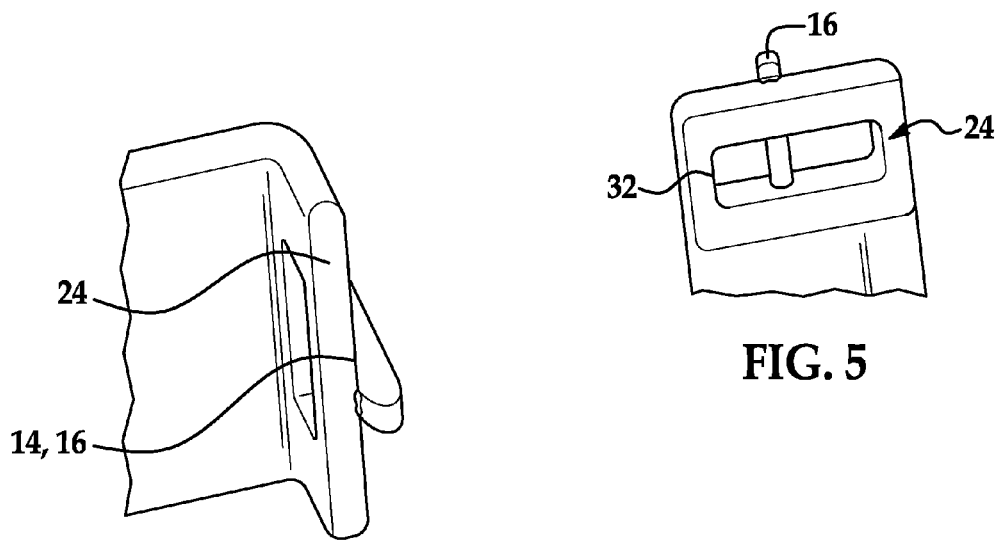
FIG. 5
FIG. 6
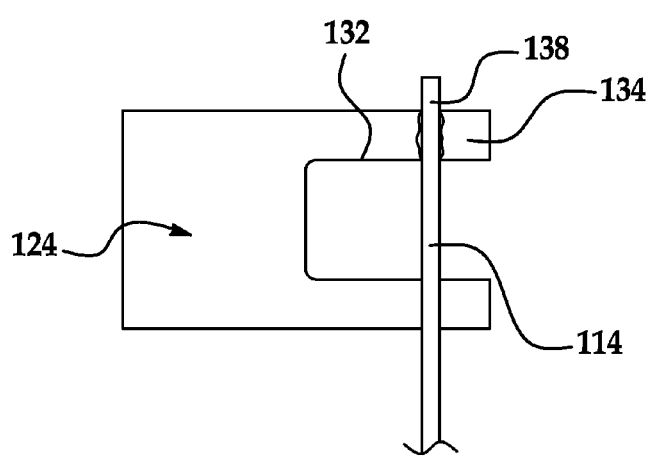
FIG. 7

WELD TERMINAL, SWITCH ASSEMBLY AND METHODS OF ATTACHMENT

CROSS REFERENCE TO RELATED APPLICATIONS

This application is a continuation of U.S. Patent Application Ser. No. 12/400,088, filed Mar. 9, 2009, the contents of which are incorporated herein by reference thereto.

BACKGROUND

Exemplary embodiments of the present invention relate to a weld terminal, switch assembly and methods of attaching leads to a terminal.

The joining of switch leads to lead frame terminals is typically accomplished by soldering, laser welding or a resistance welding processes. Soldering processes are the most widely used because of the terminal material type and the terminal geometry and/or configuration. The switch leads and lead frame terminals are typically made of brass, bronze or copper and due to their inherent high electrical conductivity, the resultant low resistance creates less than optimal conditions for standard resistance welding processes. The lead frame terminal geometry can be restrictive due to physical size constraints and subsequent molding processes where part flashing is possible.

Accordingly, it is desirable to weld terminal and method of welding that provides an improved weld and method for attachment.

SUMMARY OF THE INVENTION

In one embodiment, a terminal and electrical contact for a pair of leads of an electrical component is provided, the terminal having a pair of terminals each comprising a planar member comprising a conductive material that surrounds an opening in the planar member; and wherein one of the pair of leads is welded to one of the pair of terminals such that the lead traverses the opening and is welded to the terminal at a portion of the terminal adjacent to the opening and the other one of the pair of leads is welded to the other one of the pair of terminals such that the lead traverses the opening and is welded to the terminal at a portion of the other one of the pair of terminals adjacent to the opening, wherein the opening and the planar member are configured such that a high resistance zone is created at the portion of the terminal adjacent to the opening.

In another embodiment a switch assembly is provided, the switch assembly having a switch having a pair of conductive leads extending therefrom; a pair of terminals extending from a switch housing, each terminal comprising: a conductive material that surrounds an opening; and wherein one of the pair of leads is welded to one of the pair of terminals such that the lead traverses the opening and is welded to the terminal at a portion of the terminal adjacent to the opening and the other one of the pair of leads is welded to the other one of the pair of terminals such that the lead traverses the opening and is welded to the terminal at a portion of the other one of the pair of terminals adjacent to the opening, wherein the opening and the terminal are configured such that a high resistance zone is created at the portion of the terminal adjacent to the opening.

In another embodiment a method for joining a lead of a switch to a terminal is provided, the method comprising: resistance welding a pair of conductive leads of the switch to a pair of terminals extending from a switch housing, each terminal comprising a conductive material that surrounds an opening; and wherein one of the pair of leads is welded to one of the pair of terminals such that the lead traverses the opening and is welded to the terminal at a portion of the terminal adjacent to the opening and the other one of the pair of leads is welded to the other one of the pair of terminals such that the lead traverses the opening and is welded to the terminal at a portion of the other one of the pair of terminals adjacent to the opening, wherein the opening and the terminal are configured such that a high resistance zone is created at the portion of the terminal adjacent to the opening.

BRIEF DESCRIPTION OF THE DRAWINGS

Other features, advantages and details appear, by way of example only, in the following description of embodiments, the description referring to the drawings in which:

FIGS. 4-6 are views of welds made using exemplary embodiments of the present invention; and FIG. 7 is a plan view of a switch lead welded to a frame lead in accordance with an alternative exemplary embodiment of the present invention.

DETAILED DESCRIPTION

Figure 1:
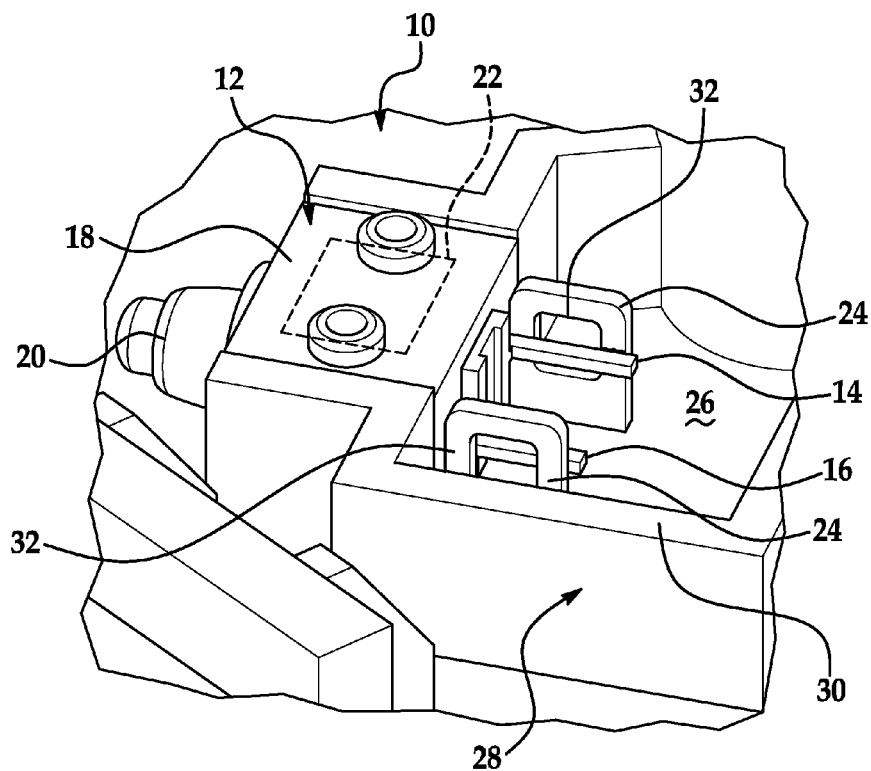
FIG. 1 is a perspective view of a switch assembly in accordance with an exemplary embodiment of the present invention.

In accordance with various embodiments of the present invention a weld terminal, switch assembly and method of securing a switch lead to a weld or frame terminal is provided. In one embodiment and referring now to FIG. 1 a switch assembly 10 in accordance with an exemplary embodiment of the present invention is illustrated. The switch assembly has a switch 12 such as a micro switch or an electrical component with a pair of leads 14, 16 extending from a housing 18 of the switch. Leads 14 and 16 comprise an electrically conductive material. In one non-limiting embodiment, the switch will have a depressible or movable actuator 20 whose movement thereof will close a circuit or switch 22 (illustrated by the dashed lines) and located within the housing. Electrically coupled to the circuit is the pair of leads 14 and 16 such that upon movement of the actuator a circuit between the leads is either closed or opened.

As illustrated, a pair of weld terminals 24 are shown extending from a surface 26 of a housing 28. Although a pair of weld terminals and a pair of leads are illustrated exemplary embodiments of the present invention contemplate numerous weld terminals as well as numerous leads thus, exemplary embodiments of the present invention are not limited to just a pair of terminals and a pair of leads.

In an exemplary embodiment each terminal is formed from a planar member comprising an electrically conductive material. In one embodiment, housing 28 has features 30 configured to engage and receive a portion of the housing of the switch. For example, features 30 may comprise an opening into which the housing of the switch is received. Each planar member 24 has a central opening 32. In one embodiment, the central opening is completely surrounded by the conductive material of the planar member.

Figure 2:
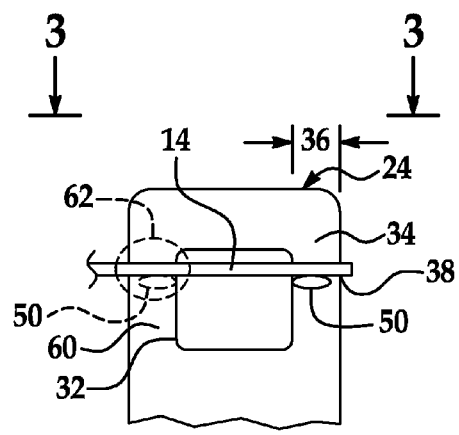
FIG. 2 is a plan view illustrating a switch lead welded to a frame lead in accordance with an exemplary embodiment of the present invention.
Figure 3:
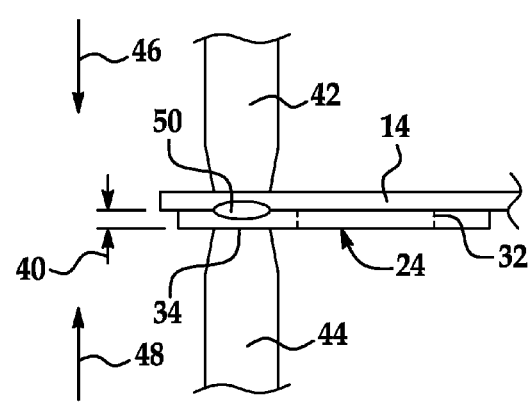
FIG. 3 is view along lines 3-3 of FIG. 2.

For example and referring now to FIGS. 2 and 3, a portion of one of the terminals is illustrated. As shown, opening 32 is surrounded by an outer peripheral portion 34 that has a dimension 36 that a portion 38 of the lead is secured to by a resistance welding process. Resistance welding is a process used to join metallic parts with electric current. Referring now to FIG. 3 a side view of the terminal/lead weld securement is illustrated. As shown, the terminal is a planar member having a thickness 40, which is substantially planar providing a flat surface to weld the lead to with a welding process namely a resistance welding process.

Resistance welding is a processes wherein at least two work pieces are secured to each other by the heat obtained from resistance of the work pieces to an electric current in a circuit of which the work piece is a part and by the application of pressure to the two work pieces. As shown in FIG. 3 a pair of electrodes 42, 44 apply a force to the work pieces (lead 14 and terminal 24) in the directions of arrows 46 and 48 while a current is applied through electrode 42, portion 38 of lead 14, portion 34 of terminal 24 and electrode 44 wherein the heat generated will cause either or both of portion 38 and 34 to melt and form a weld 50.

The size and shape of the individually formed welds are limited primarily by the size and contour of the electrodes. Thus, the use of a planar terminal and substantially planar lead allows a generally flat surface to be placed between the two electrodes. Furthermore and through the use of opening 32 dimension 36 causes the heat to be generated between the lead portion and the terminal portion. The reduced area for resistance welding reduces the weld contact area and does not require any bumps or special modification that would hinder injection molding processes.

The welding cycle must first develop sufficient heat to raise a small volume of metal to the molten state. This metal then cools while under pressure until it has adequate strength to hold the parts together. The current density and pressure must be sufficient to produce a weld nugget, but not so high as to expel molten metal from the weld zone.

In all forms of resistance welding, the parts are locally heated until a molten pool forms. The parts are then allowed to cool, and the pool freezes to form a weld nugget. To create heat, electrodes pass an electric current through the work pieces. The heat generated depends on the electrical resistance and thermal conductivity of the metal, and the time that the current is applied.

The electrodes are held under a controlled force during welding. The amount of force affects the resistance across the interfaces between the work pieces and the electrodes. The force is adjusted to immediately create heat at the interface between the work pieces.

The heat needed to produce a molten pool depends on the thermal conductivity and melting point of the metal being welded. A material with a high thermal conductivity will quickly conduct heat away from the weld pool, increasing the total heat needed to melt the pool. A low melting point will lower the heat needed. Accordingly, the smaller dimension 36 of portion 34 of the terminal will reduce the surface area of the terminal directly beneath the portion 38 of the lead being secured to the terminal thus reducing the amount of heat needed to weld the two work pieces together.

FIGS. 4-6 are various views illustrating a weld 50 of a lead to a terminal in accordance with exemplary embodiments of the present invention.

Referring back now to FIGS. 1-3 and 5 the leads are welded to the pair of terminals such that the lead traverses the opening and is welded to the weld terminal at one side of the opening. In an alternative embodiment, the lead may also be secured to the terminal at an opposite side of the opening where the lead traverses another portion 60 of the terminal shown in the area 62 of the dashed lines in FIG. 2. Accordingly and in this embodiment, the lead is secured to the terminal at two locations using a resistance welding process.

Accordingly and referring to FIG. 1 each of the leads are secured to the terminals at least one location adjacent to opening 32 or alternatively at two locations opposite opening 32.

In still another alternative embodiment and referring now to FIG. 7 a planar terminal 124 is shown with an opening 132 that is not completely surrounded by portions of terminal 124 and a portion 138 of lead 114 is resistance welded to a portion 134 of terminal 124.

The flat geometry of the lead frame terminals 24 are suitable for over-molding processes wherein the housing 28 is molded about the terminals, while the "hole" and "notch" shapes of the terminals provide good switch lead retention during the welding process.

Weld projection theory proposes increasing electrical resistance by decreasing contact surface area between the components to be joined. By taking advantage of the small side of the switch lead and mating up to a thin terminal frame section, a high resistance zone is created. The aperture geometry wherein the lead is supported on both sides provides structural support to the weld. In addition to welding advantages, the flat geometry of this design can be properly shut-off in the molding process and prevent un-wanted material from flashing into the aperture area.

In one embodiment, the thickness of the lead area contacting the terminal is 0.4 mm of course, other dimensions greater or less than 0.4 mm are contemplated in accordance with exemplary embodiments of the present invention.

In one embodiment, a method for welding leads to a planar terminal is provided. First a plurality of planar terminals are formed by a stamping or other suitable process wherein an opening is provided in the terminal and then a terminal or terminals are insert molded into an housing then a switch with terminals are placed into the housing such that a portion of a lead of the switch traverses the opening then a current and force is applied by a pair of electrodes wherein a weld is provided between the lead and the terminal. In an alternative embodiment, the lead is welded to the terminal prior to the insert molding process. In still another embodiment, the lead is welded at two locations on opposite sides of the opening of the terminal.

While the present invention has been described in terms of specific embodiments, it should be appreciated that the spirit and scope of the invention is not limited to those embodiments. The features, functions, elements and/or properties, and/or combination and combinations of features, functions, elements and/or properties of the track set may be claimed in this or a related application. All subject matter which comes within the meaning and range of equivalency of the claims is to be embraced within the scope of such claims.

What is claimed is:

1. A terminal and electrical contact for a pair of leads of an electrical component, the terminal comprising:
    a pair of terminals each comprising a planar member comprising a conductive material that surrounds an opening in the planar member; and
    wherein one of the pair of leads is welded to one of the pair of terminals such that the lead traverses the opening and is welded to the terminal at a portion of the terminal adjacent to opposite sides of the opening and the other one of the pair of leads is welded to the other one of the pair of terminals such that the lead traverses the opening and is welded to the terminal at a portion of the other one of the pair of terminals adjacent to opposite sides of the opening, wherein the opening and the planar member are configured such that a high resistance zone is created at the portion of the terminal adjacent to the opening.

2. The terminal and electrical contact as in claim 1, wherein the pair of terminals have a substantially flat profile.

3. The terminal and electrical contact as in claim 1, wherein the opening is completely surrounded by the conductive material of the terminal.

4. The terminal and electrical contact as in claim 3, wherein the opening is rectangular in shape and the terminal is rectangular in shape.

5. The terminal and electrical contact as in claim 1, wherein the pair of terminals are insert molded into a plastic housing.

6. The terminal and electrical contact as in claim 5, wherein the opening is completely surrounded by the conductive material of the terminal.

7. The terminal and electrical contact as in claim 6, wherein the opening is rectangular in shape and the terminal is rectangular in shape and each of the pair of leads are welded on opposite side of the opening.

8. A switch assembly, comprising:
a switch having a pair of conductive leads extending therefrom;
a pair of terminals extending from a switch housing, each terminal comprising:
a conductive material that surrounds an opening; and
wherein one of the pair of leads is welded to one of the pair of terminals such that the lead traverses the opening and is welded to the terminal at a portion of the terminal adjacent to the opening and the other one of the pair of leads is welded to the other one of the pair of terminals such that the lead traverses the opening and is welded to the terminal at a portion of the other one of the pair of terminals adjacent to the opening wherein the opening and the terminal are configured such that a high resistance zone is created at the portion of the terminal adjacent to the opening and wherein each of the pair of leads extends completely across the opening after the switch is secured to the pair of terminals, wherein the pair of terminals are insert molded into a plastic housing.

9. The switch assembly as in claim 8, wherein the opening is rectangular in shape and the terminal is rectangular in shape and each of the pair of leads are welded on opposite sides of the opening.

10. The switch assembly as in claim 8, wherein the switch is a micro-switch.

11. The switch assembly as in claim 8, wherein the opening is completely surrounded by the conductive material of the terminal and the pair of terminals have a substantially flat profile and the switch is a micro-switch and each of the leads are welded to opposite sides of the opening.

12. The switch assembly as in claim 8, wherein the opening is completely surrounded by the conductive material of the terminal.

13. The switch assembly as in claim 12, wherein the opening is rectangular in shape and the terminal is rectangular in shape.

14. A method of joining a switch to a terminal, comprising:
resistance welding a pair of conductive leads of the switch to a pair of terminals extending from a switch housing, each terminal comprising a conductive material that surrounds an opening; and wherein one of the pair of leads is welded to one of the pair of terminals such that the lead traverses the opening and is welded to the terminal at a portion of the terminal adjacent to opposite sides of the opening and the other one of the pair of leads is welded to the other one of the pair of terminals such that the lead traverses the opening and is welded to the terminal at a portion of the other one of the pair of terminals adjacent to opposite sides of the opening wherein the opening and the terminal are configured such that a high resistance zone is created at the portion of the terminal adjacent to the opening.

15. The method as in claim 14, wherein the opening is completely surrounded by the conductive material of the terminal.

16. The method as in claim 14, wherein the opening is rectangular in shape and the terminal is rectangular in shape and the pair of terminals have a substantially flat profile.

17. The method as in claim 14, wherein the pair of terminals are insert molded into a plastic housing prior to the welding step.

18. The method as in claim 17, wherein the opening is rectangular in shape and the terminal is rectangular in shape and the pair of terminals have a substantially flat profile and the switch is a micro-switch and each of the pair of leads are welded on opposite side of the opening.

\* \* \* \* \*